Feb. 12, 1963  R. G. LARSON  3,077,041
FOLDABLE TEACHING AID
Filed Feb. 2, 1961

INVENTOR.
RAYMOND GEORGE LARSON
BY
ATTORNEYS 3,077,041
FOLDABLE TEACHING AID
Raymond George Larson, Pasadena, Calif.
(206 W. Windsor Road, Glendale, Calif.)
Filed Feb. 2, 1961, Ser. No. 86,804
3 Claims. (Cl. 35—73)

This invention relates to foldable teaching aids, and included in the objects of this invention are:

First, to provide a foldable teaching aid which may be collapsed into a compact lightweight package, or readily expanded, when needed, to provide a flat surface having pressure sensitive adhesive qualities so that objects may be attached to illustrate lectures, sermons, instructions or other visual aids, or which may serve as a screen for projected pictures.

Second, to provide a foldable teaching aid which is particularly useful by missionaries, doctors and others who may be required to travel in remote regions to instruct and aid the inhabitants.

Third, to provide a foldable device which may be provided with a reflective surface for illuminating shadowed areas as an aid in photography.

Fourth, to provide a foldable teaching aid which, in its expanded condition, diagonally extending ribs stretch a flexible cover into a rectangle or square to provide a plane work surface, the ribs being held by struts extending from a central post from which also extends an angularly disposed brace rod so that two of the ribs and the extremity of the brace rod may rest on a supporting surface.

With the above and other objects in view as will appear hereinafter, reference is directed to the accompanying drawings, in which.

Figure 1:
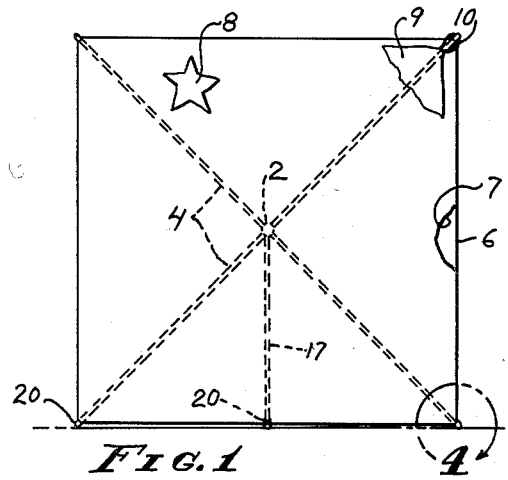
FIG. 1 is a front view of the foldable teaching aid.

The foldable teaching aid includes a central post 1 at one end of which is secured a pair of circular disc members 2 having confronting rim portions which receive a ring member 3. The disc members 2 are notched at ninety degree intervals to expose the ring member. Pivotally connected to the ring member at each notch is a rib 4.

The four ribs thus provided are movable between positions substantially parallel to the post 1 to positions at ninety degrees thereto in coplanar relation with each other. The extremities of the ribs are provided with notches 5 which receive a cable 6 adapted to occupy a stretched condition defining the corners of a square when the ribs are coplanar.

The sides of the cable 6 are sewn within the margins of a square cover 7 which may be formed of different materials depending upon the use of the device. For example, the cover may be a felt cloth or other flexible material which has to some degree the characteristics of a pressure sensitive adhesive. Conventional felt cloth or cloth having a nap is capable of adhering to similar cloth so that cutouts of such cloth, as indicated by 8 in FIG. 1, may be pressed on the cover 7 so as to be retained temporarily thereon. For such purpose the cover 7 is preferably dyed black or dark color. The cutouts vary in size and shape and are intended to convey information either pictorially or as indicia, characters or letters, to supplement a sermon, or lecture, or aid in teaching.

The cover may, in turn, serve as a support, a supplementary cover 9 having loops 10 at its corners as indicated in FIG. 1. Such supplementary cover may be light colored or white to serve as a picture screen. Alternatively, the cover 7 may itself be of such color or white to serve as a picture screen. Still further, the cover 7 may have a reflective surface and in such case be used to reflect light into shaded areas as an aid to photography.

Slidably mounted on the post 1 is a sleeve 11. The sleeve 11 is externally reduced for a portion of its length to receive a collar 12. Clamped between the shoulder formed by the reduced portion and the collar is a second pair of disc members 13 having rim portions which receive a second ring member 14 similar to the disc members 2 and ring member 3. The disc members 13 are notched at ninety degree intervals to expose the ring member 14. Journalled on the ring member 14 are four pairs of struts 15 which extend therefrom to mid-points of the four ribs 4 and are joined thereto by pins 16.

The end of the post 1 opposite from the discs 2 is slotted to journal a brace bar 17 by means of a pivot pin 18. The pivotal connection between the post and brace bar 17 is spaced inwardly from the adjacent end 19 of the brace bar 17 a sufficient distance that, when the brace bar is in angular relation with the post, this end projects beyond the surface of the post 1 to form a stop for the sleeve 11. The brace bar 17 is of sufficient length as to coact with the extremities of two of the ribs 4 to support the cover slightly inclined from the vertical as shown best in FIG. 2.

The extremities of the ribs 4 and the brace bar 17 are provided with cushion caps 20.

Retained by one end on the collar 12 is a compression coil spring 21 of sufficient length as to bear against the discs 2 when the sleeve 11 is forced onto the post 1 until clear of the stop end 19 of the brace bar 17. The struts 15 are so connected to the ribs 4 that, when the sleeve 11 is retained by the stop end 19, the ribs 4 are in essentially coplanar position and the cover 7 is stretched taut.

Figures 5, 6:
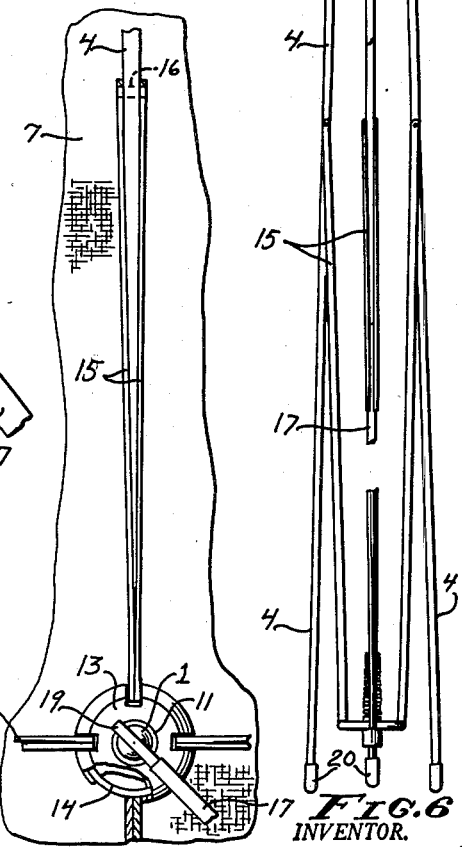
FIG. 5 is an enlarged fragmentary rear view of the foldable teaching aid taken substantially from 5—5 of FIG. 2 along one of the diagonal ribs.
FIG. 6 is a fragmentary folded view of the foldable teaching aid with the cover member removed.

Operation of the foldable teaching aid is as follows:

When the framework of the device is in its folded condition as shown in FIG. 6, the ribs 4 are in essentially parallel relation, the sleeve 11 and disc members 13 are disposed adjacent the capped end of the brace bar 17 and the struts 15 are also in essentially parallel position. In this condition of the framework, cover 7 drapes over the ribs 4 and the folds thereof may be wrapped about the ribs in the manner of an umbrella to form a compact package.

Figure 2:
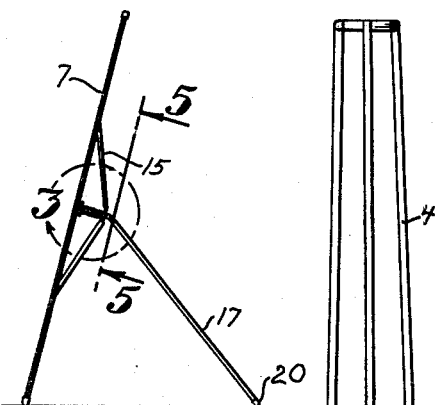
FIG. 2 is a side view thereof.
Figure 3:
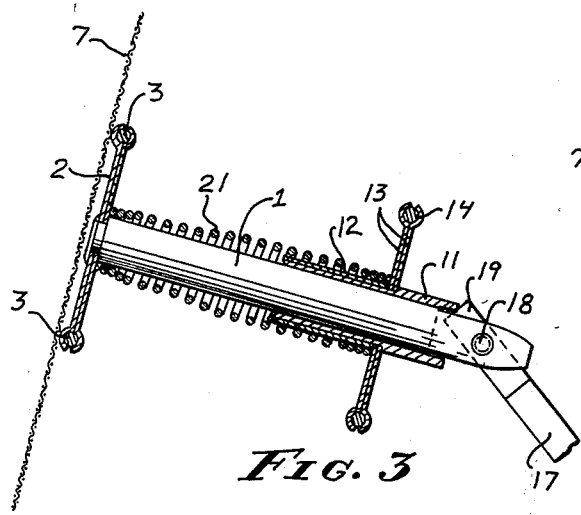
FIG. 3 is an enlarged fragmentary sectional view taken within circle 3 of FIG. 2.
Figure 4:
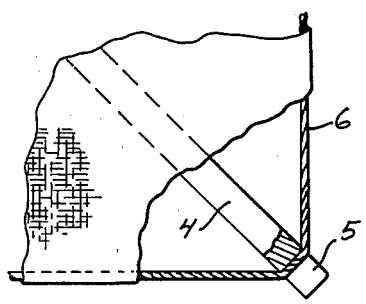
FIG. 4 is an enlarged fragmentary sectional view taken within circle 4 of FIG. 1.

When it is desired to use the device, the sleeve 11 is thrust along the brace bar 17 until past its stop end 19, then the brace bar is pivoted in angular relation to the post 1 to lock the sleeve 11 thereon. In accomplishing this, the cover 7 is drawn taut and held in a flat state by the ribs 4 and cable 6. The cable 6 functions as a tension element between the extremities of the ribs 4 to prevent the margins of the cover from sagging. The angularly positioned brace bar 17 and two of the ribs 4 may then be utilized to support the cover as shown in FIGS. 1 and 2.

Having fully described my invention it is to be understood that I am not to be limited to the details herein set forth but that my invention is of the full scope of the appended claims.

I claim:

1. A foldable teaching aid, comprising: a central post; a flat mounting disk structure capping an end of said central post; a brace bar pivotally connected with the periphery of said mounting disk and movable between a coaxial and an angular position relative to said post; ribs pivotally connected with said post and movable between positions essentially parallel thereto and in coplanar relation with each other and said mounting disk; a sleeve slidably mounted on said post and brace bar; struts pivotally connected to said sleeve and to said ribs for moving said ribs between said parallel and coplanar positions; said brace bar adapted, when angularly positioned relative to said post, to retain said sleeve in position thereby to cause said struts to secure said ribs in their coplanar positions; means connecting the extremities of said ribs; and a cover joined by its margins to said connecting means overlying said ribs and said mounting disk thereby defining and essentially plane surface when said ribs are in their coplanar positions.

2. A foldable teaching aid, comprising: a central post; a flat mounting disk structure capping an end of said central post; a set of four ribs pivotally connected with the periphery of said mounting disk and movable between positions essentially parallel thereto and in coplanar relation with each other and said mounting disk wherein the extremities of said ribs define the corners of a four sided figure; a tension element joining the extremities of said ribs; a cover joined by its margins to said tension element and overlying said ribs and said mounting disk to define, when said ribs are coplanar, an essentially flat uninterrupted surface; a brace bar pivotally connected to said post and movable between an angular position to support said ribs and cover in an inclined plane, and a coplanar position; a sleeve slidable on said post and brace bar; and struts extending from said sleeve and connected with said ribs to move said ribs between their coplanar positions and their parallel positions.

3. A foldable teaching aid as set forth in claim 2, wherein: said cover member is provided with an adherent surface.

References Cited in the file of this patent

UNITED STATES PATENTS

| | | |
|---|---|---|
| 1,860,323 | Ebeling | May 24, 1932 |
| 2,403,661 | Hurley | July 9, 1946 |
| 2,528,578 | Clapper | Nov. 7, 1950 |
| 2,914,873 | Brennan | Dec. 7, 1959 |